United States Patent [19]

Kato et al.

[11] 4,349,659
[45] Sep. 14, 1982

[54] PROCESS FOR PRODUCING AROMATIC POLYESTER

[75] Inventors: Yasuyuki Kato, Niihama; Hiroaki Sugimoto, Nara; Makoto Hanabata, Takatsuki, all of Japan

[73] Assignee: Sumitomo Chemical Company, Limited, Osaka, Japan

[21] Appl. No.: 193,301

[22] Filed: Oct. 2, 1980

[30] Foreign Application Priority Data

Oct. 18, 1979 [JP] Japan .................. 54-134778

[51] Int. Cl.³ .................. C08G 63/02; C08G 17/02
[52] U.S. Cl. .................. 528/193; 528/125; 528/126; 528/128; 528/173; 528/176; 528/179; 528/190; 528/271
[58] Field of Search ............ 528/193, 173, 176, 125, 528/126, 128, 153, 150, 271

[56] References Cited

U.S. PATENT DOCUMENTS 3,637,595  1/1972  Cottis et al. .................. 528/193
3,884,876  5/1975  Cottis et al. .................. 528/193
4,247,514  1/1981  Luise .................. 528/193

Primary Examiner—Morton Foelak
Attorney, Agent, or Firm—Stevens, Davis, Miller & Mosher

[57] ABSTRACT

In a process for producing an aromatic polyester by reacting under application of heat (A) an aromatic dicarboxylic acid and/or an ester-forming derivative thereof, (B) an aromatic hydroxycarboxylic acid and/or an ester-forming derivative thereof, and (C) a dihydroxy aromatic compound produced by the method of alkali fusion and containing 4,4'-dihydroxydiphenyl as major constituent and/or an ester-forming derivative of said dihydroxy aromatic compound, the improvement which comprises employing as said 4,4'-dihydroxydiphenyl, a 4,4'-dihydroxydiphenyl of such a quality that a solution of 1 part by weight of it dissolved in 100 parts by weight of a mixture comprising methanol and water in a weight ratio of 70:30 will show a pH of 6.6 to 7.4. The polyester produced by the improved process shows little discoloration and is excellent in thermal resistance and mechanical properties.

7 Claims, No Drawings

PROCESS FOR PRODUCING AROMATIC POLYESTER

This invention relates to a process for producing an aromatic polyester.

It has already been known that an aromatic polyester produced from terephthalic acid and isophthalic acid or derivatives of these acids and 2,2-bis(4-hydroxyphenyl)-propane (bisphenol A) or a derivative thereof is a resin excellent in mechanical properties such as tensile strength and bending strength, in thermal properties such as heat distortion temperature and thermal decomposition temperature and in electric properties, etc.

It has been further known that an aromatic polyester produced from terephthalic acid or isophthalic acid and p-hydroxybenzoic acid or its derivative with 4,4'-dihydroxydiphenyl or a derivative thereof is a resin which is not only excellent in the above-noted various properties, that is, mechanical properties, electric properties and thermal stability, but also in most of those properties which are required for the plastics to be put into actual use, such as thermal resistance, chemical resistance, oil resistance, radiation resistance and dimensional stability; in addition, it is excellent in processability.

For the production of such a resin, there have been known among others a so-called suspension polymerization method wherein the formed polymer precipitates from the solution (Japanese Patent Publication No. 6796/71) and a bulk polymerization method which employs no solvent [Japanese Patent Application Kokai (Laid-open) No. 46,291/79].

However, in each of the known methods, it is necessary that monomers used as starting materials and solvents should be of a high purity in order to obtain a polymer with satisfactory physical properties. Above all, the purity of 4,4'-dihydroxydiphenyl has a great effect upon the physical properties of the polymer. 4,4'-Dihydroxydiphenyl is produced commercially by the alkali fusion method and contains impurities, of which monohydroxy compounds, e.g. p-phenylphenol, and isomers of 4,4'-dihydroxydiphenyl, e.g. 2,4'-dihydroxydiphenyl, are known as typical ones. However, even when a 4,4'-dihydroxydiphenyl product of high purity with very low impurity content is used, problems arise in some cases in connection with polymerization, such as insufficient increase in the polymerization degree, and, in some other cases difficulty is encountered in molding or even if molding is possible, various properties including the mechanical properties are adversely affected, resulting in the deterioration of commercial value of the molded articles.

4,4'-Dihydroxydiphenyl is a substance of high melting point, high boiling point, and low solubility in solvents and, accordingly, is difficult to purify by distillation or recrystallization. Also, it requires a great deal of labor for the judgement of its purity.

Determination of the purity of 4,4'-dihydroxydiphenyl is generally performed by chromatographic techniques such as gas chromatography and liquid chromatography or by various instrumental methods such as infrared spectroscopy, ultraviolet spectroscopy, and magnetic resonance or by chemical analytical methods such as elementary analysis, titration, etc.

However, each of the above analytical methods has advantages and disadvantages and it is time-consuming to perform the analysis of one sample of 4,4'-dihydroxydiphenyl by using various analytical methods. Even though the purity in terms of weight percent of 4,4'-dihydroxydiphenyl is sufficiently high, the remaining traces of impurities sometimes have adverse effects on the polymer and keep it from exhibiting satisfactory physical properties.

Under the circumstances, the present inventors conducted extensive studies to develop a process for producing a polymer of satisfactory quality and, as a result, found that it is possible to solve the problems of insufficient increase in the polymerization degree and the adverse effect on various physical properties of the polymer, by the simple employment of specified 4,4'-dihydroxydiphenyl which show a hydrogen ion concentration in a specified range, without necessitating the identification and determination of impurities in the 4,4'-dihydroxydiphenyl. Based on the finding, the present invention has been accomplished.

An object of this invention is to provide a novel improved process for the production of an aromatic polyester.

Another object of this invention is to provide a polyester excellent in thermal resistance and mechanical properties.

Other objects and advantages of this invention will become apparent from the following description.

According to this invention, there is provided an improved method in producing an aromatic polyester by reacting under application of heat (A) an aromatic dicarboxylic acid and/or an ester-forming derivative thereof, (B) an aromatic hydroxycarboxylic acid and/or an ester-forming derivative thereof, and (C) a dihydroxy aromatic compound produced by the method of alkali fusion and containing 4,4'-dihydroxydiphenyl as major constituent and/or an ester-forming derivative of said dihydroxy aromatic compound, wherein the improvement comprises employing, as said 4,4'-dihydroxydiphenyl a 4,4'-dihydroxydiphenyl of such a quality that a solution of 1 part by weight of it dissolved in 100 parts by weight of a mixture comprising methanol and water in a weight ratio of 70:30 will show a pH of 6.6 to 7.4.

Typical examples of the component (A) used in the present process are terephthalic acid, isophthalic acid, 2-methylterephthalic acid, and naphthalenedicarboxylic acids, or ester-forming derivatives thereof such as, for example, lower alkyl esters, phenyl esters and acid halides; examples of individual ester-forming derivatives include dimethyl terephthalate, diphenyl terephthalate and diphenyl isophthalate.

Typical examples of the component (B) are p-hydroxybenzoic acid, m-hydroxybenzoic acid, 3,5-dimethyl-4-hydroxybenzoic acid, 6-carboxy-$\beta$-naphthol and 5-carboxy-$\alpha$-naphthol or ester-forming derivatives thereof such as, for example, lower alkyl esters, phenyl esters or acid halides; examples of individual ester-forming derivatives include methyl p-hydroxybenzoate, and phenyl p-hydroxybenzoate.

Of the above compounds, particularly preferred are p-hydroxybenzoic acid, p-acetoxybenzoic acid and phenyl p-hydroxybenzoate.

Typical Examples of the component (C) are 4,4'-dihydroxydiphenyl, hydroquinone, resorcinol, 4,4'-dihydroxydiphenyl sulfide, 4,4'-dihydroxydiphenyl sulfone, 4,4'-dihydroxydiphenyl ether, 4,4'-dihydroxybenzophenone and 4,4'-dihydroxydiphenylmethane, or ester-forming derivatives thereof such as alkanoylated derivatives. The alkanoylation can be conducted by using lower alkanoic anhydrides such as, for example, acetic anhydride, propionic anhydride, butyric anhydride and isobutyric anhydride, or lower alkanoyl halides such as acetyl chloride and propionyl chloride.

In the component (C), the proportion of 4,4'-dihydroxydiphenyl and/or an ester-forming derivative thereof should be 50% by weight or more, preferably 70% by weight or more, of the total amount of component (C). If they are less than 50%, it is difficult to obtain satisfactory physical properties of the polymer.

4,4'-Dihydroxydiphenyl used in this invention is produced by the method of alkali fusion. The production process comprises reacting diphenyl, used as starting material, with sulfuric acid or the like to form a sulfonic acid compound, neutralizing the latter with, for example, sodium hydroxide to convert it into a salt form which is then reacted by fusion with an alkali such as sodium hydroxide, and hydrolyzing the reaction product to obtain 4,4'-dihydroxydiphenyl.

The 4,4'-dihydroxydiphenyl used in this invention should be of such a quality that a solution of 1 part by weight of it dissolved in 100 parts by weight of a methanol-water mixture comprising methanol and water in a weight ratio of 70:30 shows a pH in the range of 6.6 to 7.4. If pH is smaller than 6.6, the polymer produced from such 4,4'-dihydroxydiphenyl is markedly discolored, resulting in a decrease of commercial value, and, moreover, is deteriorated in thermal stability and mechanical properties such as tensile strength. If pH is greater than 7.4, the increase in polymerization degree becomes difficult and the moldability becomes worse; even if molding is possible, the molded article will be brittle and easily broken.

When an ester-forming derivative of 4,4'-dihydroxydiphenyl is used as the component (C) in the process of this invention, the pH of the 4,4'-dihydroxydiphenyl to be used as the starting material is tested to judge the suitability as the starting material.

When the pH of the 4,4'-dihydroxydiphenyl is not in the range of 6.6 to 7.4, as measured as described above, it can be purified, for example, by means of using an ion exchange resin, to adjust the pH in the range of 6.6 to 7.4.

For the production of the present polyester, a bulk polymerization method and a suspension polymerization method are desirable, though other methods are conceivable. The bulk polymerization is especially preferred, because no organic solvent is used, recovery of the polymer is easier and it is more economical. The bulk polymerization can be carried out by any of the known procedures.

For instance, there is a procedure in which the three components (A), (B) and (C) are simultaneously charged into a reactor. The condensation reaction can proceed at about 200° to 400° C., preferably about 250° to 350° C. Since the rate of condensation increases with the temperature, it is convenient to carry out the reaction at a comparatively high temperature. In a preferred procedure of bulk polymerization, the polymerization is allowed to proceed while applying a shearing force so that the polymer formed from the monomers at the polymerization temperature may not solidify into a mass but may be maintained in a state of polydispersion until substantially the entire reaction system is transformed to a solid phase. Although depending partly upon the boiling point or decomposition point of the employed monomers or oligomers, the allowable maximum reaction temperature is comparatively low in the early stage of reaction and becomes higher with the progress of condensation. In a preferred embodiment, polymerization is allowed to proceed under atmospheric or subatmospheric pressure at a temperature of 80° to 250° C. in the early stage, then at an elevated temperature of 250° to 380° C., preferably 300° to 360° C. When the polydispersion state is attained, the temperature can be elevated to 300° to 400° C., preferably 310° to 370° C., while taking into consideration the fusion temperature or decomposition temperature of the polymer. Below the fusion or decomposition temperature, the rate of reaction increases with the temperature.

Alternatively, the three components (A), (B) and (C) are charged into a first reactor, and the mixture is subjected to polycondensation to form a prepolymer, and then the formed prepolymer is transferred into a second reactor to form a high polymer. In this case, the prepolymer formed in the first reactor may be charged into the second reactor after it has been taken out from the first reactor in a molten state and then pulverized, or the prepolymer may be subjected to further polymerization in the second reactor after peletized by an extruder.

A catalyst may be used to promote the polymerization but the amount of catalyst should be such that the catalyst residue in the polymer will not adversely affect the polymer. The catalysts commonly used in the production of aromatic polyesters may be employed.

The reaction system in the present process can be further incorporated with common additives used in plastics such as stabilizers, coloring matters and fillers in amounts not injuring the polymer characteristics.

When added to the bulk polymerization system, particularly the fillers inert to the polymerization facilitate the formation of a polydispersion of solid polymer. Examples of fillers used in this case are silica, powdered quartz or sand, fumed silica, silicon carbide, aluminum oxide, glass fibers, tin oxide, iron oxide, zinc oxide, carbon and graphite. Pigments such as titanium oxide and other inorganic pigments and heat-resistant organic pigments are used.

The polymer obtained according to this invention may be processed by press molding, injection molding and extrusion molding into the forms of molded articles, sheets and films which are used widely in the fields covering mechanical parts, electrical parts, motorcar parts, various containers and packaging materials, where high performance characteristics of engineering plastics are required.

According to this invention, there is obtained a polymer with little discoloration and excellent in thermal resistance and mechanical properties.

The invention is illustrated below with reference to Examples and Comparative Examples which are merely illustrative and not limitative.

In Examples, the heat loss is a weight loss in percent when a predetermined quantity of a polymer is left standing for 5 hours in an oven maintained at 380° C.; it is one of the indices representing the stability of the polymer at a high temperature. The pH can be determined by either the electrode method using a pH meter or the neutralizing titration method using an indicator. In the following Examples and Comparative Examples, pH was determined by the electrode method using a pH meter of Toa Dempa Co. The purity of 4,4'-dihydroxydiphenyl was determined by means of a high-speed liquid chromatograph (Model 6000 A of Waters Co.).

EXAMPLE 1

Into a polymerization vessel provided with an anchor impeller with close clearance between the impeller and the wall of vessel, were charged 756 g of p-hydroxybenzoic acid, 453 g of terephthalic acid, 508 g of 4,4'-dihydroxydiphenyl produced by the method of alkali fusion, and 1,224 g of acetic anhydride. The 4,4'-dihydroxydiphenyl was of such a quality that a solution of 1 g of it dissolved in 100 g of a methanol-water mixture (70:30 by weight) showed a pH of 6.90, as measured by the pH meter. The purity was 99.5% 4,4'-dihydroxydiphenyl accompanied with 0.4% p-phenylphenol, as determined by the liquid chromatography. The above mixture was heated under a nitrogen atmosphere to 150° C. over a period of 1 hour and refluxed for a further 3 hours. Thereafter, while removing by distillation the acetic acid formed by the reaction with the increase of temperature, the temperature of the mixture was elevated to 330° C. under the application of a high shearing force. An increase of the torque was observed. The polymerization was continued for a further 2 hours with intensive agitation. Then, the polymerizate was allowed to cool gradually down to 200° C., while continuing intensive agitation. The polymerizate in powder form was withdrawn out of the polymerization vessel. The recovered powder was 1,411 g (93% of the theoretical). The powder was transferred to a rotary aluminum oven and heated under a nitrogen current gradually to 360° C. over a period of 6 hours. The powder was then cooled down to 200° C. and withdrawn from the oven to obtain 1,380 g of a powder. The powder was injection molded at 390° C. to prepare dumbbell test specimens. The tensile strength was found to be 1,120 kg/cm$^2$. The molded specimen was very slightly yellowish in color and had a favorable appearance. When one tried to bend the specimen with both hands, it showed a strength high enough to require a considerable force for bending. The heat loss of the polymer was 1.1%.

EXAMPLE 2

Into a polymerization vessel similar to that in Example 1, were charged 378 g of p-hydroxybenzoic acid, 227 g of terephthalic acid, 205 g of the same 4,4'-dihydroxydiphenyl as used in Example 1, 29.7 g of hydroquinone, and 612 g of acetic anhydride. The mixture was treated in the same manner as in Example 1 to obtain a polymer in powder form which was injection molded at 370° C. The molded specimen showed a tensile strength of 920 kg/cm$^2$ and was good in color, appearance and strength. The heat loss of the polymer was 1.8%.

EXAMPLE 3

In a manner similar to that in Example 1, 756 g of p-hydroxybenzoic acid, 453 g of isophthalic acid, 508 g of 4,4'-dihydroxydiphenyl produced by the method of alkali fusion, and 1,224 g of acetic anhydride were allowed to react. The pH of the 4,4'-dihydroxydiphenyl was 7.05, as measured in the same manner as in Example 1. The purity was 96.5% 4,4'-dihydroxydiphenyl accompanied with 3.3% p-phenylphenol, as determined by the liquid chromatography. The polymer obtained was injection molded at 390° C. to obtain a specimen having a tensile strength of 890 kg/cm$^2$, a good color and a good appearance. On comparison with the results of Example 1, no influence of p-phenylphenol was detected.

COMPARATIVE EXAMPLE 1

A polymer was obtained in the same manner as in Example 1, except that a 4,4'-dihydroxydiphenyl having a pH of 6.50, as measured in the same manner as in Example 1, and a purity of 99.5% (0.4% p-phenylphenol content) was used. The polymer removed from the polymerization vessel was in the form of block with a minor amount of powder and was reddish brown in color. When injection molded at 380° C., the molded article showed increased discoloration, becoming brown in color. The tensile strength of a dumbbell test specimen was 511 kg/cm$^2$. When one tried to bend the specimen with both hands, it broke easily, being brittle. The heat loss of the polymer was as large as 6.3%.

EXAMPLES 4 AND 5

COMPARATIVE EXAMPLES 2 TO 4

In a manner similar to that in Example 1, polymers were obtained by using various grades of 4,4'-dihydroxydiphenyl having varied pH's. The color and heat loss of each polymer and properties as well as tensile strengths of the molded articles were as shown in Table 1. In Table 1 are also shown the results obtained in Examples 1 to 3 and Comparative Example 1.

TABLE 1

| | Starting material | | | | | 4,4-Dihydroxydiphenyl | | Polymer color | Heat loss (%) | Molding temperature (°C.) | Quality of molded article | Tensile strength (kg/cm$^2$) |
| | p-Hydroxybenzoic acid (g) | Terephthalic acid (g) | 4,4'-Dihydroxydiphenyl (g) | Hydroquinone (g) | Acetic anhydride (g) | pH | Purity* | | | | | |
| --- | --- | --- | --- | --- | --- | --- | --- | --- | --- | --- | --- | --- |
| Example 1 | 756 | 453 | 508 | 0 | 1224 | 6.90 | 99.5/0.4 | White to yellow | 1.1 | 390 | Good | 1120 |
| Example 2 | 378 | 227 | 205 | 29.7 | 612 | 6.90 | 99.5/0.4 | White to yellow | 1.8 | 370 | Good | 920 |
| Example 3 | 756 | Isophthalic acid 453 | 508 | 0 | 1224 | 7.05 | 96.5/3.3 | White to yellow | 1.7 | 390 | Good | 890 |
| Comparative Example 1 | 756 | 453 | 508 | 0 | 1224 | 6.50 | 99.5/0.4 | Reddish brown | 6.3 | 380 | Brown and brittle | 511 |
| Example 4 | 756 | 453 | 508 | 0 | 1224 | 7.05 | 96.5/3.3 | White to yellow | 1.4 | 390 | Good | 1025 |
| Comparative Example 2 | 756 | 453 | 508 | 0 | 1224 | 7.46 | 99.5/0.4 | White to yellow | 4.3 | 370 | Slightly brittle | 620 |
| Comparative Example 3 | 378 | Isophthalic acid 227 | 255 | 0 | 612 | 6.00 | 96.5/3.3 | Brown | 9.3 | 390 | Brown and brittle | 420 |

TABLE 1-continued

| | Starting material | | | | | 4,4-Dihydroxydiphenyl | | Polymer color | Heat loss (%) | Injection molding | | |
| | p-Hydroxybenzoic acid (g) | Terephthalic acid (g) | 4,4'-Dihydroxydiphenyl (g) | Hydroquinone (g) | Acetic anhydride (g) | pH | Purity* | | | Molding temperature (°C.) | Quality of molded article | Tensile strength (kg/cm$^2$) |
|---|---|---|---|---|---|---|---|---|---|---|---|---|
| Example 5 | 378 | Isophthalic acid 227 | 255 | 0 | 612 | 6.90 | 99.5/0.4 | White to yellow | 1.5 | 390 | Good | 920 |
| Comparative Example 4 | 378 | 227 | 205 | 29.7 | 612 | 7.50 | 99.5/0.4 | White to flesh tint | 5.1 | 370 | Brittle | 550 |

Note:
*"Purity" means "4,4'-dihydroxydiphenyl (%)/p-phenylphenol" (%).

What is claimed is:

1. In a process for producing an aromatic polyester by reacting under application of heat (A) an aromatic dicarboxylic acid and/or an ester-forming derivative thereof, (B) an aromatic hydroxycarboxylic acid and/or an ester-forming derivative thereof, and (C) a dihydroxy aromatic compound produced by the method of alkali fusion and containing 4,4'-dihydroxydiphenyl as major constituent and/or an ester-forming derivative of said dihydroxy aromatic compound, the improvement which comprises employing, as said 4,4'-dihydroxydiphenyl, a 4,4'-dihydroxydiphenyl of such a quality that a solution of 1 part by weight of it dissolved in 100 parts by weight of a mixture comprising methanol and water in a weight ratio of 70:30 will show a pH of 6.6 to 7.4.

2. A process according to claim 1, wherein the aromatic dicarboxylic acid of the component (A) is terephthalic acid, isophthalic acid, 2-methylterephthalic acid or a naphthalenedicarboxylic acid; and the ester-forming derivative thereof is a lower alkyl ester, a phenyl ester or an acid halide.

3. A process according to claim 1, wherein the aromatic hydroxycarboxylic acid of the component (B) is p-hydroxybenzoic acid, m-hydroxybenzoic acid, 3,5-dimethyl-4-hydroxybenzoic acid, 6-carboxy-β-naphthol or 5-carboxy-α-naphthol; and the ester-forming derivative thereof is a lower alkyl ester, a phenyl ester or an acid halide.

4. A process according to claim 1, wherein the dihydroxy aromatic compound of the component (C) is 4,4'-dihydroxydiphenyl, hydroquinone, resorcinol, 4,4'-dihydroxydiphenyl sulfide, 4,4'-dihydroxydiphenyl sulfone, 4,4'-dihydroxydiphenyl ether, 4,4'-dihydroxybenzophenone or 4,4'-dihydroxydiphenylmethane; and the ester-forming derivative thereof is an alkanoylated product.

5. A process according to claim 1, wherein the aromatic dicarboxylic acid is terephthalic acid and/or isophthalic acid and the aromatic hydroxycarboxylic acid is p-hydroxybenzoic acid.

6. A process according to claim 1, wherein the amount of 4,4'-dihydroxydiphenyl contained in the dihydroxy aromatic compound is 50% by weight or more.

7. A process according to claim 1, wherein the production of the polyester is performed by a bulk polymerization method or a suspension polymerization method.

* * * * *